United States Patent
Tchouankem et al.

(10) Patent No.: US 12,550,023 B2
(45) Date of Patent: Feb. 10, 2026

(54) METHOD FOR PREDICTIVE CHANNEL SELECTION

(71) Applicant: Robert Bosch GmbH, Stuttgart (DE)

(72) Inventors: Hugues Narcisse Tchouankem, Hemmingen (DE); Marie-Theres Suer, Braunschweig (DE); Maximilian Stark, Hamburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 294 days.

(21) Appl. No.: 18/494,940

(22) Filed: Oct. 26, 2023

(65) Prior Publication Data
US 2024/0163755 A1 May 16, 2024

(30) Foreign Application Priority Data
Nov. 11, 2022 (EP) .................................... 22206871

(51) Int. Cl.
*H04W 36/08* (2009.01)
*H04L 41/16* (2022.01)
(Continued)

(52) U.S. Cl.
CPC ............ *H04W 36/08* (2013.01); *H04L 41/16* (2013.01); *H04W 24/08* (2013.01); *H04W 36/30* (2013.01); *H04W 36/304* (2023.05); *G06N 3/08* (2013.01)

(58) Field of Classification Search
None
See application file for complete search history.

(56) References Cited

U.S. PATENT DOCUMENTS 12,088,358 B2 * 9/2024 Stark .................. H04B 17/26
2016/0353299 A1 * 12/2016 Sayeed ............... H04W 36/304
(Continued)

FOREIGN PATENT DOCUMENTS

| AT | 247944 B | 7/1966 |
| WO | 2022022334 A1 | 2/2022 |

OTHER PUBLICATIONS

IEEE 802.11P-2010 Standard, "IEEE Standard for Information Technology—Local and Metropolitan Area Networks—Specific Requirements—PART 11: Wireless Lan Medium Access Control (MAC) and Physical Layer (PHY) Specifications, Amendment 6: Wireless Access in Vehicular Environments," IEEE Computer Society, 2010, pp. 1-51.

(Continued)

*Primary Examiner* — Mounir Moutaouakil
(74) *Attorney, Agent, or Firm* — NORTON ROSE FULBRIGHT US LLP (57) ABSTRACT

A method for training a reinforcement learning model forming a channel switching agent in a wireless communication network. The method includes: obtaining a predicted quality of service indicator for one or more channels of a wireless network for a future period of time; providing the predicted quality of service indicator as input to a reinforcement learning model which is configured to provide an output related to a channel selection for the first communication link; if the output indicates a selection of a new channel different from the currently active channel for the first communication link, initiating a channel switching procedure for the first communication link to a second channel; obtaining measurement results indicating a current quality of service for at least the first communication link; determining a reward for the reinforcement learning model based on the (Continued)

obtained measurement results; and adapting the reinforcement learning model based on the reward.

16 Claims, 3 Drawing Sheets

(51) Int. Cl.
*H04W 24/08* (2009.01)
*H04W 36/30* (2009.01)
*G06N 3/08* (2023.01)

(56) References Cited

U.S. PATENT DOCUMENTS

| | | |
|---|---|---|
| 2021/0314238 A1 | 10/2021 | Cioffi et al. |
| 2021/0326695 A1 | 10/2021 | Vitebsky et al. |
| 2022/0278728 A1* | 9/2022 | Vankayala ........... H04B 7/0639 |
| 2023/0007564 A1* | 1/2023 | Balasubramanian ....................... H04L 25/0254 |
| 2023/0283523 A1* | 9/2023 | Singh .................. H04L 43/0876 709/223 |
| 2025/0168079 A1* | 5/2025 | Li ........................ H04B 7/0456 |
| 2025/0193087 A1* | 6/2025 | Li ........................ H04B 17/328 |
| 2025/0212019 A1* | 6/2025 | Li ........................ H04B 17/328 |
| 2025/0274800 A1* | 8/2025 | Bai ....................... G06N 20/00 |

OTHER PUBLICATIONS

Etengu et al., "AI-Assisted Framework for Green-Routing and Load Balancing in Hybrid Software-Defined Networking: Proposal, Challenges and Future Perspective," IEEE Access, IEEE, vol. 8, 2020, pp. 166384-166441.
Wu et al., "A Learning-Based QOE-Driven Spectrum Handoff Scheme for Multimedia Transmissions Over Cognitive Radio Networks," IEEE Journal on Selected Areas in Communications, vol. 32, No. 11, 2014, pp. 2134-2148.

* cited by examiner

METHOD FOR PREDICTIVE CHANNEL SELECTION

CROSS REFERENCE

The present application claims the benefit under 35 U.S.C. § 119 of European Patent Application No. EP 22 20 6871.0 filed on Nov. 11, 2022, which is expressly incorporated herein by reference in its entirety.

FIELD

The present invention relates to a method and a device for channel selection and a method for training a machine learning model for channel selection.

BACKGROUND INFORMATION

Wireless communication systems such as wireless local area networks (WLAN) are prone to performance degradation due to interference from other systems or between channels. Interference may lead to transmission delays, reduced connection speeds, undesired disconnections and other problems. It is common to monitor parameters of a wireless connection and to switch a communication link from the current channel to another channel when increased interference is detected. Various triggers may be used for such a channel switch, such as increased interference or reduced quality of service.

However, these methods only work in a reactive manner after degradation is already present. It is therefore desirable to provide an improved method for avoiding interference related performance issues and to improve quality of service.

SUMMARY

The present invention provides a method and a device for channel selection using a machine learning model and a method for training such a model are disclosed, as well as a processing system and a computer program product for performing the method steps.

In particular, according to an example embodiment of the present invention, a method is provided for training a reinforcement learning model forming a channel switching agent in a wireless communication network, wherein a predicted quality of service indicator is obtained for one or more channels of a wireless network for a future period of time, and wherein a first communication link is currently active on at least a first one of said one or more channels. The predicted quality of service (QoS) indicator is provided as input to a reinforcement learning model, said model being configured to provide an output related to a channel selection for said first communication link. If the output of the model indicates a selection of a new channel different from said currently active channel for said first communication link, a channel switching procedure for said first communication link to a second channel out of said one or more channels is initiated. Further, measurement results indicating a current quality of service for at least said first communication link are obtained, and a reward for said reinforcement learning model based on said obtained measurement results is determined. Finally, the reinforcement learning model is adapted (e.g. by changing the weights for a neural network) based on said reward.

In this way, a trained channel switching agent is able to proactively initiate channel switching based on predictions for quality of service in a wireless network instead of only reacting to deteriorations, with the reinforcement learning ensuring that the model will make optimal use of the predictions.

In some embodiments of the present invention, additional information related to said first communication link and/or related to at least one out of said one or more channels may be provided as an input to said reinforcement learning model. This effectively reduces the action space of the channel switching agent and thus provides better results and a more precise trained policy. Such information may, for example, include a data traffic profile for data communicated on said first communication link; a data traffic profile for data transmitted on at least one other channel out of said one or more channels: an indication of restricted and/or allowed channels out of said one or more channels for said first communication link; a bandwidth limit for said one or more channels; or any desirable combination of one or more such parameters. For example, a data traffic profile may include information on time frames where no or low priority data is transmitted on a link, and a channel switching procedure may then be timed such that it is performed during these silent time frames. In other cases, some channels may be unavailable or undesirable, due to regulatory restrictions, technical issues, specific data profiles, other services provided on a channel, and the model may then exclude certain channels from the available channels in the channel selection.

According to an example embodiment of the present invention, the reinforcement reward may, for example, be determined such that at least one parameter obtained by said measurement results is minimized. Alternatively, the reward may be determined such that an amount of time is minimized during which at least one parameter obtained by said measurement results is outside of a predefined threshold. Parameters to be used for the reward function may depend on the specific application and on characteristics of the wireless network; for example, a packet error rate, a desired data rate, a jitter rate, a packet delay, and/or end-to-end-delay may be considered.

According to an example embodiment of the present invention, a model that has been trained using the above methods and variations may then be used in a method for channel switching in a wireless communication network, where again a predicted quality of service indicator is obtained for one or more channels of a wireless network for a future period of time, wherein a first communication link is currently active on at least a first one of said one or more channels. The predicted quality of service indicator is provided as input to the trained reinforcement learning model, with the model being configured to provide an output related to a channel selection for said first communication link. If said output indicates a selection of a new channel different from said currently active channel for said first communication link, a channel switching procedure for said first communication link to a second channel out of said one or more channels is initiated.

Optionally, according to an example embodiment of the present invention, at least one trigger condition for retraining said model may be checked, and, if said trigger condition is fulfilled, the trained model may be retrained using the training method or variations thereof as detailed above. In this way, the model does not require a reinforcement feedback loop during normal operation, thus reducing data overhead and processing times, but may re-trained to optimize the model at any time. The check for triggering conditions may, just as an example, be performed e.g. continuously and/or whenever new measurement results are received.

According to an example embodiment of the present invention, triggering conditions for retraining the model may for example include one or more of the following: a threshold for a number of active communication links on said one or more channels; a threshold for bandwidths used on said one or more channels; an indication of a start of an application at a device connected via an active communication link on said one or more channels; a reception of a trigger message; a threshold for one or more parameters related to a quality of service on said one or more channels; a detection of another wireless system communicating on the same frequency band and/or an adjacent frequency band; a change of availability of at least one of said one or more channels.

Obtained measurement results, both in operation and/or in training, for example comprise one or more of: a transmission latency on a channel; a throughput rate on a channel; an indication of variation of transmission delay on a channel. Measurement results of any kind may for example be received from at least one device connected via an active communication link on at least one of said one or more channels, said measurement results providing an indication of a current quality of service. Alternatively, or in addition thereto, a central station such as an access point or another managing module of a wireless network may perform measurements related to quality of service and may provide these in the same way as measurement results.

According to an example embodiment of the present invention, the predicted quality of service indicator for one or more channels of a wireless network for a future period of time may, at least in part, be based on such obtained measurement results. In other cases, separate measurements may be provided for the QoS prediction. An entity performing such a prediction of quality of service may be combined with or included with the channel switching agent and the model as described above, or may also be provided in a separate module or even a separate device.

An output of the reinforcement learning model (both during training and operation) may for example comprise an indication of said second channel and/or an indication of a timing of a channel switching procedure. It may also comprise a simple output indicating that the communication link should stay on the current channel without switching.

The methods and variations summarized above may be performed at a central station of a wireless network, in particular at an access point of a wireless local area network.

Further, according to an example embodiment of the present invention, a device is provided which comprises a wireless communication interface for communicating with at least one endpoint using a first communication link on one or more channels of a wireless network; a predictive quality of service entity configured for providing a predicted quality of service indicator for said one or more channels for a future period of time; and a channel switching agent comprising a reinforcement learning model, said model being configured to provide an output related to a channel selection for said first communication link based at least on said predicted quality of service indicator; wherein said channel switching agent is configured for performing a method according to an embodiment of the present invention. Such a device may be included at any node of a wireless network, but may in particular form a central station such as an access point of a wireless local area network.

Instead of monitoring current quality of service and reactively switching communication channels when link quality has already degraded, this solution allows to proactively switch from one communication channel to another based on a predicted quality of service with improved decisions.

Methods as disclosed here may be implemented as computer-executable instructions such as program modules, executed by one or more computers or other devices. Generally, program modules include routines, programs, objects, components, data structures, etc. that perform particular tasks or implement particular abstract data types. Typically, the functionality of the program modules may be combined or distributed.

Also, according to an example embodiment of the present invention, data structures may be stored in one or more non-transitory computer-readable storage media in any suitable form. Suitable storage media for providing computer program products may for example include hard drives, volatile or non-volatile flash memory, DVDs, and others. Computer programs or parts thereof may be downloaded via wired or wireless communication networks, such as WLAN, Bluetooth, mobile networks such as 3G-/4G-/5G/6G-networks and others.

BRIEF DESCRIPTION OF THE DRAWINGS

This disclosure of the present invention is illustrated by way of example, and not by way of limitation, in the accompanying figures in which like reference numerals are used to refer to similar elements.

DETAILED DESCRIPTION OF EXAMPLE EMBODIMENTS

In the following, implementations will be described with reference to the accompanying figures. The implementations may, however, be embodied in many different forms and should not be construed as limited to the examples set forth herein.

The methods described here may for example be used in channel planning, static or dynamic channel selection and/or channel switching in wireless communication networks. Such communication networks usually define one or more portions of a frequency spectrum for operation, which is then divided into multiple bands of defined bandwidth and/or channels. Channels may for example be defined as smaller bands within a defined frequency band. Information to be communicated on the wireless network between clients may be transmitted on one channel/band only, or may be transmitted in various configurations on multiple bands/channels in combination.

To ensure consistent operation, most communication systems make use of central stations which are responsible for connecting clients to the network, avoiding collisions, allocating channels, selecting transmission parameters and other tasks. Of course, several central stations may be employed in a network, and these may also communicate with each other on the same wireless network. Some architectures may provide a hierarchical or distributed system of different control entities for separate tasks. It is also possible to connect endpoints without use of a central station, e.g. as a mesh network. Wireless clients may then be connected to this central station for enabling communication both between clients and with other networks linked to the central station, such as wired networks or long-range mobile networks.

The following examples will at times refer to a wireless communication network based on the wireless local area network (WLAN) in accordance with standard group IEEE 802.11, "Wireless LAN Medium Access Control and Physical Layer Specifications" which is available in different protocol versions all maintained and further developed by the Institute of Electrical and Electronics Engineers (IEEE) LAN/MAN Standards Committee. However, the general idea of a cognitive agent for predictive channel switching is not limited to networks following these standards, but may be employed with any wireless communication network of similar architecture, i.e. networks operating on multiple bands or channels which make use of channel selection or channel switching techniques.

In IEEE 802.11 networks, several radio spectral bands are utilized for communication depending on the version of the standard, including the 2.4 GHz band (spectrum between 2.4-2.5 GHz), and the 5 GHz band (spectrum between 4.915 and 5.825 GHz). Other versions, in particular future versions of 802.11, or other standard protocols may employ different radio spectra. These spectra are subdivided into channels each defined by a center frequency and a bandwidth of the channel. For example, the 2.4 GHz band includes 11 channels with overlapping frequencies, such that only three channels are available without any overlap. Band usage may also be defined by legal regulations and may thus be dependent on geographical regions. Different standards may operate on different bands and may make use of the available bandwidth in different ways.

The general features of wireless local area networks are described in the art, in particular those implemented according to the above protocols, and will therefore not be explained in further detail in this description.

An access point will usually be responsible for allocating one or more channels for a desired communication link with a wireless client. Evidently, it is desired to achieve high quality of service and to avoid interference, collisions or other issues that might reduce link quality. Optimum channel selection is therefore of importance, both when connecting a new wireless client and with an established communication link. Newer protocol versions of IEEE 802.11 also include possibilities to combine several channels for achieving higher communication bandwidth (channel bonding), or to use multiple radio links of different frequency channels/bands (multi-link operation). The methods described in the following are advantageous for all these and further applications related to channel/band selection in wireless networks. The term "channel" in this description is not to be understood as being limited to any particular type of channel, any standard or any specific implementation, but may refer broadly to any predefined continuous or combined frequency band provided for communication between two devices.

Interference on a communication channel may for example stem from other system operating on the same or neighbouring frequency bands or from neighbouring or overlapping channels of the same system. To avoid interference, it is therefore necessary to plan channels for all connected clients, and it may further be necessary to switch a client connection from one channel to another when interference conditions deteriorate.

Figure 1:
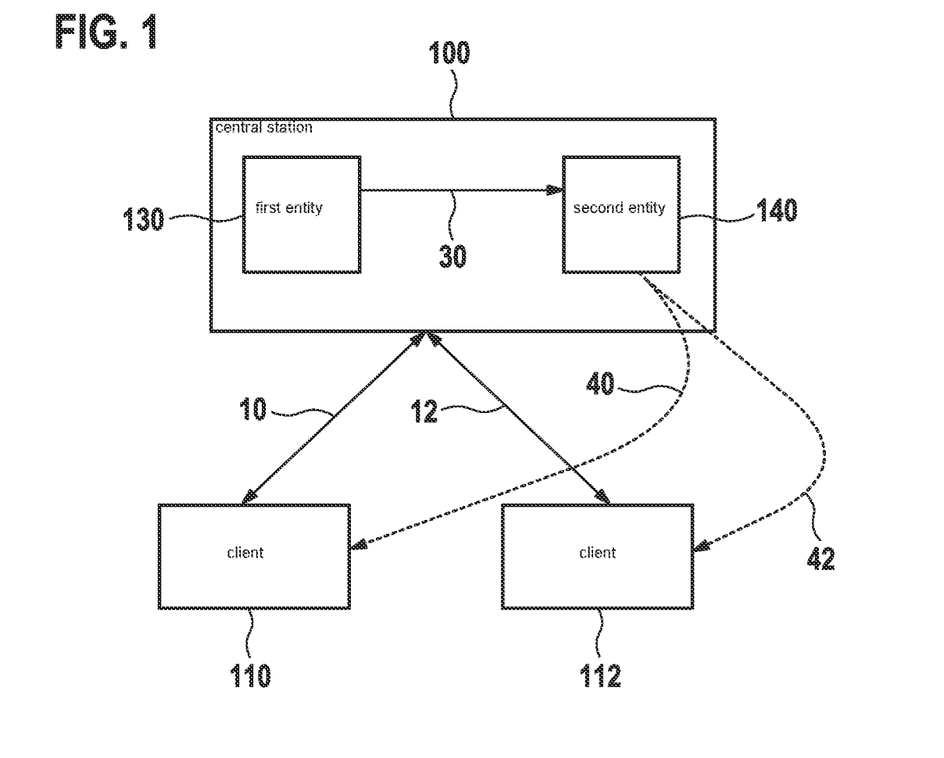
FIG. 1 is a schematic illustration of a wireless architecture having an access point including a channel switching agent and a predictive QoS entity, according to an example embodiment of the present invention.

FIG. 1 is a schematic illustration of an exemplary architecture in a wireless communication network. A central station 100, such as a WLAN access point, may be connected to one or more wireless terminals (clients) 110, 112 using wireless communication links 10, 12 to transmit data to and/or receive data from each client. The central station 100 may include two entities 130, 140 which work together for enabling predictive channel selection; a first entity 130 providing predictive indications 30 of quality of service on channels, and a second entity 140 proactively deciding on dynamic channel switching. These entities may be implemented as separate hardware modules, as one combined hardware module, and/or as software modules running on a processing unit of the central station and may interact with further modules and units of the central station or other devices. It should be noted that this architecture is only provided by way of example and one or both of these entities do not need to be an integral part of an access point, but may also be implemented fully or in part in separate devices.

The predictive quality of service entity (pQoS) 130 may perform measurements and/or may receive measurement results of one or more parameters indicative for quality of service on each active radio channel 10, 12. Such measurements may in particular be performed periodically by the connected clients 110, 112 for each channel they are connected to and then transmitted to the access point 100 in measurement reports. In addition, or as an alternative, measurements may be performed by a unit at the access point, which may form part of the predictive quality of service entity, but may also be a separate module. The first entity, i.e. the pQoS entity 130, may then evaluate the measurement data for all channels and provide a prediction on the quality of service of these channels for a future time period. This time period may be of predefined length or may depend on the prediction process, e.g. depending on the quality and/or amount of the measured input data used for a prediction. Results 30 of a predictive quality of service entity 130 may be provided as an output of the pQoS entity in various forms; for example, the pQoS entity may provide a ranking of all available channels based on the determined quality of service for the future period of time. Other embodiments may provide one or more parameter values indicating a quality of service for each available channel, such that the receiving entity may further process these parameters in any desired way.

The pQoS entity may use various input parameters to predict future values of different QoS metrics on the channel that the system is currently operating on.

The pQoS entity could be implemented as a neural network, where the trainable parameters would equal the weights and biases of the neural network.

The pQoS entity could be implemented in e.g. a network where stations share their active (measured latency, measured packet loss rate, measured data rate, etc.) and passive network measurements (measured signal strength, measured noise level, etc.) with an access point (AP). The AP can collect beacons from other networks operating on the current channel as well as on neighboring channels. This information is fed into the trainable pQoS entity. The output of the pQoS entity can either be used by the AP e.g., to initiate a channel switching decision or to stay on the current channel by sharing it with connected stations. It is understood in this context, that measurements and their corresponding predictions might refer to QoS in general.

Outputs from the first entity may then be provided to the second entity 140 which is implemented as a channel switching agent based on a machine learning model. In particular, a machine learning model using reinforcement learning may be used and is described as such in the following examples.

Figure 2:
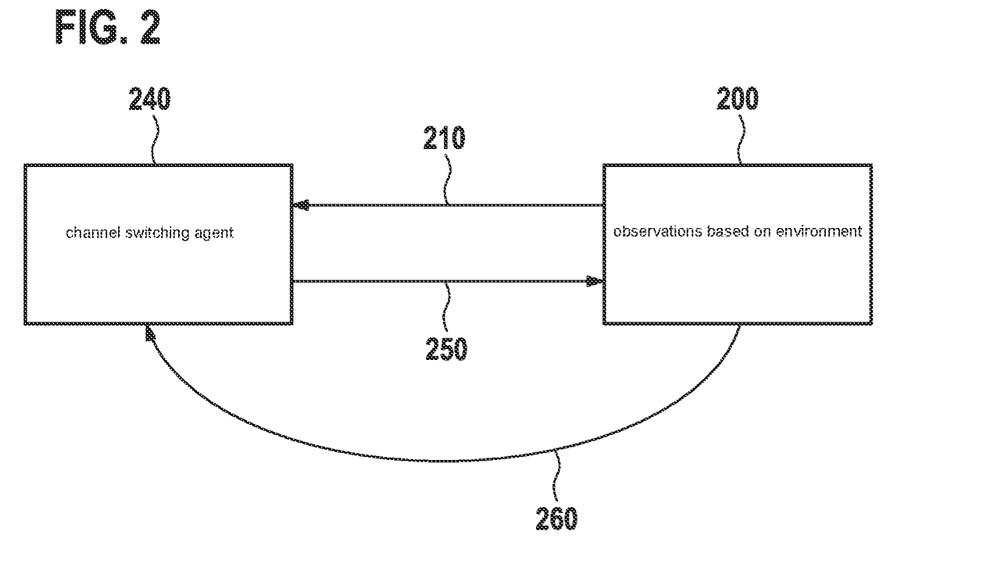
FIG. 2 shows basic elements of a logical system architecture according to an exemplary embodiment of the present invention.

FIG. 2 illustrates a logical architecture of an exemplary embodiment. A channel switching agent 140, 240 obtains information 210 on quality of service, in this case in the form of predictions based on observations of the environment 200 (any observable physical environment, in particular channel measurements). Based on this information the agent decides on an action 250 towards the environment, which may in a simple example be to either stay on the current communication channel or switch to another communication channel at a specific time instant. Referring to the architecture in FIG. 1, the channel switching agent may indicate a new channel to a client 110, 112 in a channel switching message 40, 42, and the client 110, 112 may then perform the necessary steps for establishing a link together with the access point on the new channel. The action may change a state of the environment, which is again observed by the agent. By observing the new state of the environment, the agent determines the negative or positive reward 260 for the performed actions and is updated accordingly.

As an example, a conferencing system for a number of communicating clients in a wireless network may be considered as an application for the following description.

Figure 3A:
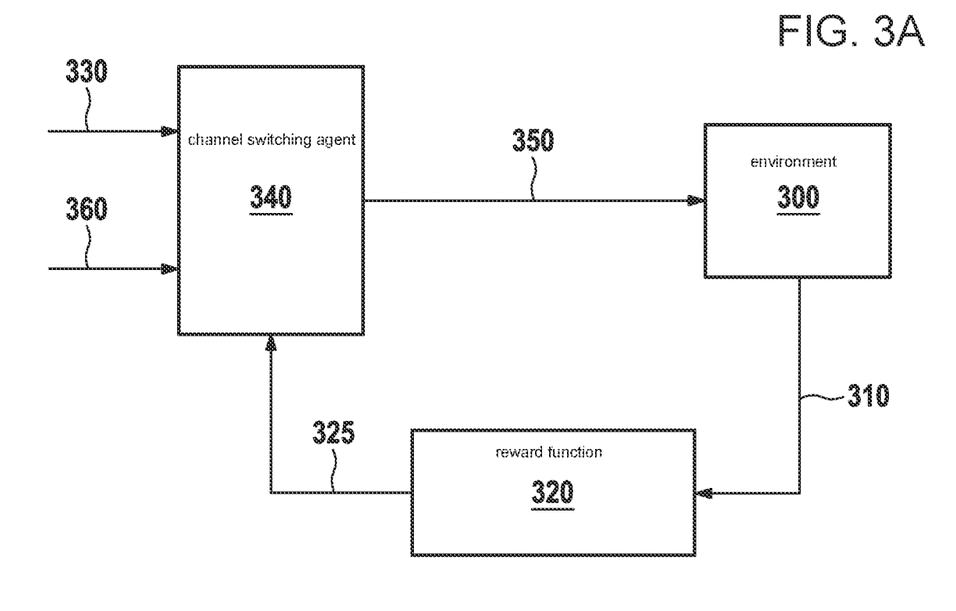
FIG. 3A depicts a training mode for a channel switching agent according to an exemplary embodiment of the present invention.

FIG. 3a schematically illustrates a training mode for a channel switching agent 340. Reinforcement learning is based on a machine learning model, such as a neural network, learning a policy to select its actions 350 towards the environment 300 such that a reward is maximized. The reward, in turn, is determined by a reward function 320 based on observed states 310 of the environment 300, such as measured parameters on a current communication channel. Based on the reward, weights 325 of the neural network 340 (or alternative parameters of a machine learning model) may be changed, thus adapting the model based on the observations 310. In the present example, actions 350 for the channel switching agent are basically limited to two different actions and may be defined as waiting, i.e. staying on the channel in question, and moving, i.e. switching to another channel.

The agent receives the output from the predictive quality of service entity, such as a channel ranking 330, which is used as an input for the neural network 340.

For the second action, i.e. moving to another channel, further information 360 may be injected into the model 340. That is, while classical reinforcement learning only observes feedback from its interaction with the environment for training, the present method may use additional sources of input. One option is to inject domain knowledge about adjacent channels. For example, it may be possible that certain channels or bands are not accessible due to regulatory restrictions. In other cases, a particular traffic profile on some channels might prevent safe operation of the desired communication on such channels. The additional input may thus serve to constrain the action space for the agent, i.e. allow only moving to a limited set of channels.

Another option for additional information 360 to be injected into the agent model 340 is knowledge about an actual traffic profile of an application generating the data to be transmitted on the channel, such as the use of certain messaging protocols with defined transmission sequences, silent times where a link is not used, a used bandwidth, priority assignments and others. Again, this knowledge may serve to constrain the action space by selecting only those channels which fit the required traffic profile, and/or by allocating channels to various applications and communication links such that all links are optimized. Also, the traffic profile may be used for optimizing a point in time for channel switching, such that switching may e.g. be done when the corresponding application does not generate any data to be transmitted.

The injection of additional knowledge 360 therefore fuses information from the physical environment and information from the digital environment. The additional knowledge may be used as model input, or may alternatively be used as a second step: first, the algorithm may aim to determine the channel switching policy based on the input from the predictive QoS entity and the observed interaction with the physical environment. Second, the additional knowledge may be used for optimizing the determined channel switching policy (time, channel selection, or others). This improves overall system performance.

In a more complex embodiment, other actions 350 or more actions may be defined for the agent, such as band aggregation, channel puncturing or others. It will be understood that the simple illustration here may be transferred to any of these and other situations for channel selection/band allocation.

The performance of the system is also based on selecting a proper reward function 320 for training. For a conferencing system as an example, the aim may be to minimize system latency and packet error rate of the transmissions. A reward may then be defined either as a discrete or a continuous reward. As a discrete reward, the objective may be defined such that a duration and frequency of exceeding a predefined threshold for latency and/or packet error rate are minimized. A continuous reward may include minimizing the latency and packet error rate directly. The reward function (objective function) thus uses measured environment parameters, such as the latency and packet error rate, as an input and serves to compute updated weights 325 of the neural network 340 as a result.

Figure 3B:
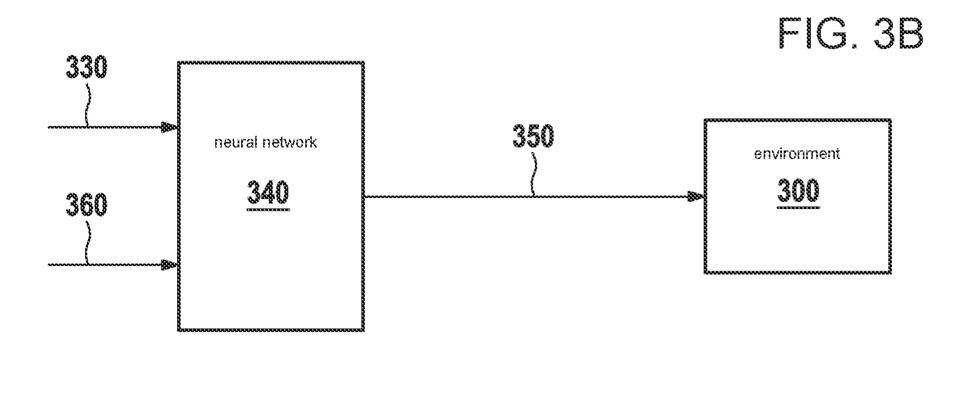
FIG. 3B depicts an operation mode for a channel switching agent, according to an example embodiment of the present invention.

After training is completed, the system may be used in operation mode as illustrated schematically in FIG. 3b. Here, no reinforcement or reward is used. Inputs may be provided to the model 340 as before, i.e. the predicted quality of service indicators 330 and additional knowledge 360, and the model returns a selected optimal action 350 (switch channel or stay on channel) as an output. The operation mode thus works as an open control system without feedback information from the environment, leading to a significant reduction of communication overhead.

As an additional option, a mechanism may be used for re-training the model. While such a change back into training mode may, of course, be set manually when desired, a system may also be implemented such that the channel switching agent is returning into training mode with reinforcement based on trigger conditions during operation mode.

Using again the example of a conferencing system, exemplary trigger conditions for entering re-training mode may be a system start (i.e. starting operation of the conferencing system); an observation of increased network load or indication of network load above a threshold (e.g. increased number of active microphones in the system); a detection or announcement of external factors (e.g. detection of a concurrent wireless system operating on the same frequency band). These are only listed as examples, and any arbitrary trigger condition may be used for triggering a training mode in a pre-trained model.

Figure 4:
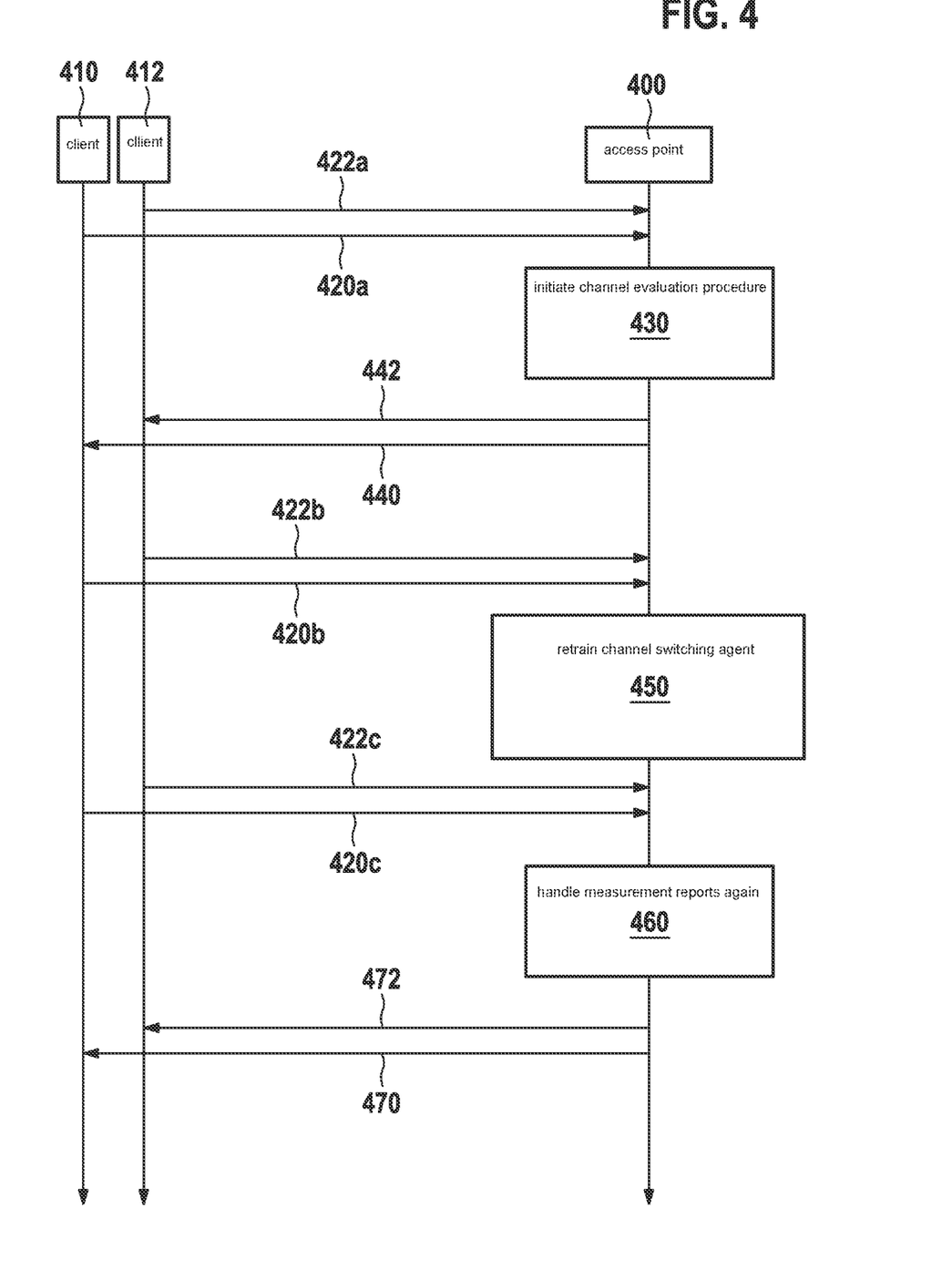
FIG. 4 is a sequence diagram of messages and method steps between clients and an access point, according to an example embodiment of the present invention.

FIG. 4 depicts exemplary procedures running at an access point and a sequence of messages exchanged between access point 400 and clients 410, 412. Measurement reports 420a/b/c and 422a/b/c may be provided by connected clients 410, 412 to an access point 400 in predefined intervals, and/or based on trigger conditions (such as a new connection or reconnect), and/or on request from the access point. If re-training is defined to be triggered based on parameters included in the measurement reports 422a, 420a, these may be checked in a first step when received at the access point 400, e.g. by comparing to predefined thresholds or reading a flag from the reports. The measurement report 420a, 422a received from clients 410, 412 may then be used for initiating a channel evaluation procedure 430 as described above, i.e. a predictive QoS entity may use these measurement reports (and, optionally, additional information) for predicting quality of service on the channels in a predetermined future time period. The channel switching agent may obtain the output of the predictive QoS entity and determine, for one or more channels, whether a channel should be switched, optionally adding further options such as a certain time when a channel should be switched. If channels are to be switched for one of the clients, the access point 400 may indicate this back to the client in suitable messages 440, 442, which may for example comprise the number of the channel to be used from now on. If the decided action of the channel switching agent is to stay on the channel, this may optionally also be communicated to a client, or may alternatively be left without a response to the client.

In the next step, another set of measurement reports 420b, 422b is received at the access point 400 from connected clients 410, 412. If a triggering condition for re-training is met, such as one of the parameters included in the measurement report exceeding a predefined threshold value, re-training 450 of the channel switching agent is initiated. As described before, the measurement results reported in messages 420b, 422b may be used as observed feedback for determining a reward, and the reward may then be used by the agent for adapting parameters of the model such that the reward is maximized. It is also possible that other parameters not included in the measurement reports are used for the reward function, such as parameters determined by measurements at the access point. Optionally, the same measurement reports 420b, 422b may also be used as input for QoS prediction and potential channel switching by the agent.

In other examples, re-training 450 of the channel switching agent may be triggered by conditions independent of the measurement reports. In that case, it may e.g. be defined that when a re-training is triggered, the next measurement report received at the access point may be used for retraining. Alternatively, one or more previous measurement reports may be stored and used for retraining once a triggering condition has been met. It is also possible to define a number of future measurement reports that are to be used as training data/observation data for retraining the model, such that e.g. the next five measurement reports may be used for reinforcement learning in the way described above for training mode.

The model has thus been retrained and the clients will continue to send measurement reports 420c, 422c, which are then again handled in step 460 as in step 430, i.e. used as an input for the predictive quality of service entity. Again, the access point may transmit a response 470, 472 indicating the action to take, e.g. a channel number or an indication that the current channel is maintained.

The described method combines predictions of transmission quality on a radio channel, in particular predictions of quality of service (QoS), with an active channel switching agent based on a trained machine learning model, preferably an agent trained by reinforcement learning. It will be understood that the examples given in the above description are only intended to provide an understanding of the general idea, and that method steps, devices, modules and other elements may be implemented in alternative ways as those mentioned. For example, the method may be used with any type of predictive quality of service mechanism, and with any time frame of prediction. Entities and modules which have been shown as part of a central station, in particular as part of an access point, may also be provided as a separate, independent module or may be combined into other devices and stations. Message sequences that have been described in the examples may be arranged in different order, messages may be combined or left out where possible, and other messages may be added which may or may not be related to the described channel switching method. It should further be noted that any detail mentioned in one of the examples may also be combined with the implementations shown in other examples; for example, all the details given with regard to the predictive QoS entity and the channel switching agent for FIG. 1, 2, or 3, may of course be applied to and combined with the disclosure of the exemplary message sequence in FIG. 4, and vice versa.

What is claimed is:

1. A method for training a reinforcement learning model forming a channel switching agent in a wireless communication network, the method comprising the following steps:
    obtaining a predicted quality of service indicator for one or more channels of a wireless network for a future period of time, wherein a first communication link is currently active on at least a first channel of the one or more channels;
    providing the predicted quality of service indicator as input to a reinforcement learning model, the model being configured to provide an output related to a channel selection for the first communication link;
    when the output indicates a selection of a new channel different from the currently active channel for the first communication link, initiating a channel switching procedure for the first communication link to a second channel out of the one or more channels;
    obtaining measurement results indicating a current quality of service for at least the first communication link;
    determining a reward for the reinforcement learning model based on the obtained measurement results; and
    adapting the reinforcement learning model based on the reward.

2. The method of claim 1, further comprising:
    providing additional information related to the first communication link and/or related to at least one out of the one or more channels, as an input to the reinforcement learning model.

3. The method of claim 2, wherein the additional information includes one or more of:
- a data traffic profile for data communicated on the first communication link;
- a data traffic profile for data transmitted on at least one other channel out of the one or more channels;
- an indication of restricted and/or allowed channels out of the one or more channels for the first communication link;
- a bandwidth limit for the one or more channels.

4. The method of claim 1, wherein the reward is determined such that at least one parameter obtained by the measurement results is minimized.

5. The method of claim 1, wherein the reward is determined such that an amount of time is minimized during which at least one parameter obtained by the measurement results is outside of a predefined threshold.

6. The method of claim 1, wherein the obtained measurement results include one or more of:
- a transmission latency on a channel;
- a throughput rate on a channel;
- an indication of variation of transmission delay on a channel.

7. The method of claim 1, further comprising:
receiving measurement results from at least one device connected via an active communication link on at least one of the one or more channels, the measurement results providing an indication of a current quality of service.

8. The method of claim 1, further comprising:
determining the predicted quality of service indicator for one or more channels of a wireless network for a future period of time based on the obtained measurement results.

9. The method of claim 1, wherein the output of the reinforcement learning model includes an indication of the second channel and/or an indication of a timing of a channel switching procedure.

10. The method of claim 1, wherein the method is performed at an access point of a wireless local area network.

11. A method for channel switching in a wireless communication network, the method comprising the following steps:
- obtaining a predicted quality of service indicator for one or more channels of a wireless network for a future period of time, wherein a first communication link is currently active on at least a first channel of the one or more channels;
- providing the predicted quality of service indicator as input to a trained reinforcement learning model, the model being configured to provide an output related to a channel selection for the first communication link;
- when the output indicates a selection of a new channel different from the currently active channel for the first communication link, initiating a channel switching procedure for the first communication link to a second channel out of the one or more channels;
- wherein the trained machine learning model has been trained using the following training method:
  - obtaining a first predicted quality of service indicator for the one or more channels of a wireless network for a future period of time, wherein a second communication link is currently active on at least one channel of the one or more channels,
  - providing the first predicted quality of service indicator as input to the reinforcement learning model, the model being configured to provide an output related to a channel selection for the second communication link,
  - when the output indicates a selection of a new channel different from the currently active channel for the second communication link, initiating a channel switching procedure for the second communication link to a different channel out of the one or more channels,
  - obtaining measurement results indicating a current quality of service for at least the second communication link;
  - determining a reward for the reinforcement learning model based on the obtained measurement results; and
  - adapting the reinforcement learning model based on the reward.

12. The method of claim 11, further comprising:
checking at least one trigger condition for retraining the reinforcement learning model; and
when the trigger condition is fulfilled, re-training the reinforcement model using the training method.

13. The method of claim 12, wherein the trigger condition includes one or more of:
- a threshold for a number of active communication links on the one or more channels;
- a threshold for bandwidths used on the one or more channels;
- an indication of a start of an application at a device connected via an active communication link on the one or more channels;
- a reception of a trigger message;
- a threshold for one or more parameters related to a quality of service on the one or more channels;
- a detection of another wireless system communicating on the same frequency band and/or an adjacent frequency band;
- a change of availability of at least one of the one or more channels.

14. A data processing system, comprising:
a processor configured to train a reinforcement learning model forming a channel switching agent in a wireless communication network, the processor configured to:
- obtain a predicted quality of service indicator for one or more channels of a wireless network for a future period of time, wherein a first communication link is currently active on at least a first channel of the one or more channels;
- provide the predicted quality of service indicator as input to a reinforcement learning model, the model being configured to provide an output related to a channel selection for the first communication link;
- when the output indicates a selection of a new channel different from the currently active channel for the first communication link, initiate a channel switching procedure for the first communication link to a second channel out of the one or more channels;
- obtain measurement results indicating a current quality of service for at least the first communication link;
- determine a reward for the reinforcement learning model based on the obtained measurement results; and
- adapt the reinforcement learning model based on the reward.

15. A non-transitory computer-readable medium on which is stored a computer program product including instructions for training a reinforcement learning model forming a channel switching agent in a wireless communication network, the instructions, when executed by a processing system, causing the processing system to perform the following steps:

obtaining a predicted quality of service indicator for one or more channels of a wireless network for a future period of time, wherein a first communication link is currently active on at least a first channel of the one or more channels;

providing the predicted quality of service indicator as input to a reinforcement learning model, the model being configured to provide an output related to a channel selection for the first communication link;

when the output indicates a selection of a new channel different from the currently active channel for the first communication link, initiating a channel switching procedure for the first communication link to a second channel out of the one or more channels;

obtaining measurement results indicating a current quality of service for at least the first communication link;

determining a reward for the reinforcement learning model based on the obtained measurement results; and     adapting the reinforcement learning model based on the reward.

16. A device, comprising:

a wireless communication interface for communicating with at least one endpoint using a first communication link on one or more channels of a wireless network;

a predictive quality of service entity configured to provide a predicted quality of service indicator for the one or more channels for a future period of time; and     a channel switching agent including a reinforcement learning model, the model being configured to provide an output related to a channel selection for the first communication link based at least on the predicted quality of service indicator;

wherein the channel switching agent is configured to train the reinforcement learning model, the channel switching agent being configured to:

obtain a first predicted quality of service indicator for the one or more channels of the wireless network for a future period of time, wherein a second communication link is currently active on at least a one of the one or more channels;

provide the first predicted quality of service indicator as input to a reinforcement learning model, the model being configured to provide an output related to a channel selection for the second communication link;

when the output indicates a selection of a new channel different from the currently active channel for the second communication link, initiate a channel switching procedure for the second communication link to a second channel out of the one or more channels;

obtain measurement results indicating a current quality of service for at least the second communication link;

determine a reward for the reinforcement learning model based on the obtained measurement results; and     adapt the reinforcement learning model based on the reward.

\* \* \* \* \*